(12) United States Patent
Nishimura et al.

(10) Patent No.: US 10,801,432 B2
(45) Date of Patent: Oct. 13, 2020

(54) CONTROL DEVICE FOR ENGINE

(71) Applicant: Mazda Motor Corporation, Aki-gun, Hiroshima (JP)

(72) Inventors: Hiroyuki Nishimura, Higashihiroshima (JP); Hiroshi Hayashibara, Hiroshima (JP); Goro Tsuboi, Hiroshima (JP); Hiroshi Yamada, Hiroshima (JP); Yoshiyuki Sato, Hiroshima (JP); Yoshio Mizuta, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 3 days.

(21) Appl. No.: 16/263,274

(22) Filed: Jan. 31, 2019

(65) Prior Publication Data
US 2019/0242312 A1  Aug. 8, 2019

(30) Foreign Application Priority Data
Feb. 6, 2018 (JP) .................................. 2018-019452

(51) Int. Cl.
*F02D 41/02* (2006.01)
*F01N 3/08* (2006.01)
(Continued)

(52) U.S. Cl.
CPC ........... *F02D 41/028* (2013.01); *F01N 3/021* (2013.01); *F01N 3/0814* (2013.01);
(Continued)

(58) Field of Classification Search
CPC ............... F01N 13/009; F01N 2430/06; F01N 2570/18; F01N 2610/02; F01N 2900/1602;
(Continued)

(56) References Cited

U.S. PATENT DOCUMENTS

| 2011/0206584 A1* | 8/2011 | Dobson | B01D 53/9472 423/213.5 |
| 2014/0102078 A1* | 4/2014 | Park | F01N 3/0807 60/274 |
| 2018/0274415 A1* | 9/2018 | Dobson | F02M 26/15 |

FOREIGN PATENT DOCUMENTS

JP  4241032 B2  3/2009

* cited by examiner

*Primary Examiner* — Anthony Ayala Delgado
(74) *Attorney, Agent, or Firm* — Alleman Hall Creasman & Tuttle LLP

(57) ABSTRACT

An engine control device is provided, which includes an oxidation catalyst provided in an exhaust passage to oxidize unburned fuel within exhaust gas, a $NO_x$ catalyst provided integrally with or downstream of the oxidation catalyst, a PM filter provided in the exhaust passage downstream of the oxidation catalyst to capture fine particulate matter within the exhaust gas, a fuel injector, and a controller. When the particulate matter is accumulated by a given amount, the controller starts a PM filter regeneration control to remove the particulate matter, and after this control is started and when the accumulation amount decreases by a given amount, the controller starts a $NO_x$ catalyst regeneration control to switch between a first state in which an air-fuel ratio of the exhaust gas is a stoichiometric air-fuel ratio or less and a second state in which the air-fuel ratio is higher than the stoichiometric air-fuel ratio.

11 Claims, 8 Drawing Sheets

(51) Int. Cl.
  *F01N 3/021* (2006.01)
  *F01N 3/10* (2006.01)
  *F02D 41/14* (2006.01)
  *F01N 9/00* (2006.01)
  *F02D 41/40* (2006.01)
  *F02D 41/00* (2006.01)
  *F01N 3/20* (2006.01)
  *F01N 13/00* (2010.01)

(52) U.S. Cl.
  CPC ......... *F01N 3/0842* (2013.01); *F01N 3/0871* (2013.01); *F01N 3/0885* (2013.01); *F01N 3/103* (2013.01); *F01N 9/002* (2013.01); *F01N 13/009* (2014.06); *F02D 41/0007* (2013.01); *F02D 41/025* (2013.01); *F02D 41/029* (2013.01); *F02D 41/0275* (2013.01); *F02D 41/1454* (2013.01); *F02D 41/1475* (2013.01); *F02D 41/401* (2013.01); *F02D 41/405* (2013.01); *F01N 3/2066* (2013.01); *F01N 2430/06* (2013.01); *F01N 2570/18* (2013.01); *F01N 2610/02* (2013.01); *F01N 2900/1602* (2013.01); *F01N 2900/1606* (2013.01); *F02D 2200/0802* (2013.01); *F02D 2200/0806* (2013.01); *F02D 2200/0812* (2013.01); *F02D 2200/0818* (2013.01)

(58) Field of Classification Search
  CPC ............. F01N 2900/1606; F01N 3/021; F01N 3/0814; F01N 3/0842; F01N 3/0871; F01N 3/0885; F01N 3/103; F01N 3/2066; F01N 9/002; F02D 2200/0802; F02D 2200/0806; F02D 2200/0812; F02D 2200/0818; F02D 41/0007; F02D 41/025; F02D 41/0275; F02D 41/028; F02D 41/029; F02D 41/1454; F02D 41/1475; F02D 41/401; F02D 41/405
  See application file for complete search history.

CONTROL DEVICE FOR ENGINE

TECHNICAL FIELD

The present disclosure relates to a control device for an engine.

BACKGROUND

JP4241032B2 discloses an engine including, in an exhaust passage thereof, a $NO_x$ catalyst which stores $NO_x$ and reduces the stored $NO_x$ for purification, and a particulate matter (PM) filter which captures fine particulate matter.

The $NO_x$ catalyst captures, in addition to $NO_x$, sulfur components in exhaust gas, so that the $NO_x$ storage capacity decreases corresponding to the amount of the stored sulfur components. This is referred to as sulfur poisoning. The sulfur poisoning needs to be eliminated through removal of the sulfur components from the $NO_x$ catalyst so that the $NO_x$ catalyst can keep its capability of storing and reducing $NO_x$ at a high level. During a $NO_x$ catalyst regeneration control for removing the sulfur components from the $NO_x$ catalyst, an air-fuel ratio of the exhaust gas is set to be rich, that is, lower than or close to a stoichiometric air-fuel ratio, and the $NO_x$ catalyst releases the sulfur components and reduce $NO_x$ using, for example, unburned fuel supplied as a reducing agent.

In order to maintain the performance of the PM filter, an excessive accumulation of fine particulate matter needs to be prevented. During a PM filter regeneration control for removing the fine particulate matter from the PM filter, a post injection is performed while the air-fuel ratio of the exhaust gas is lean, that is, higher than the stoichiometric air-fuel ratio. Thus, oxygen and unburned fuel are supplied to the PM filter, so that the fine particulate matter combusts and is removed from the PM filter.

In the engine disclosed in JP4241032B2, when there is an excessive accumulation of fine particulate matter in the PM filter during the $NO_x$ catalyst regeneration control, this control is switched to the PM filter regeneration control, which is continued until the accumulation amount of fine particulate matter falls below a given amount. In this case, the $NO_x$ catalyst is subjected to high temperature conditions until the PM filter regeneration control is terminated.

The present inventors have found that when the $NO_x$ catalyst is subjected to high temperature conditions, an occluding agent carried by the $NO_x$ catalyst may coagulate and make it difficult for the sulfur components to react with the reducing agent, so that it becomes difficult to remove the sulfur components from the $NO_x$ catalyst by the $NO_x$ catalyst regeneration control. Furthermore, the present inventors have found that as the PM filter regeneration control is prolonged and/or is executed at higher temperatures, coagulation of the occluding agent in the $NO_x$ catalyst is further accelerated and hinders the reaction of the sulfur components with the reducing agent.

SUMMARY OF THE DISCLOSURE

The present disclosure is made based on the above findings and aims to provide a device and method of controlling an engine, which enable more efficient elimination of sulfur poisoning of a $NO_x$ catalyst as well as efficient removal of fine particulate matter from a PM filter.

According to one aspect of the present disclosure, a control device for an engine is provided, which includes an oxidation catalyst provided in an exhaust passage of the engine and configured to oxidize unburned fuel within exhaust gas, a $NO_x$ catalyst provided integrally with the oxidation catalyst or in the exhaust passage downstream of the oxidation catalyst, a particulate matter (PM) filter provided in the exhaust passage downstream of the oxidation catalyst and configured to capture fine particulate matter within the exhaust gas, an injector configured to supply fuel to a combustion chamber of the engine, and a controller connected to the injector and including a processor configured to control an amount of the fuel injected from the injector. When determining that an accumulation amount of the fine particulate matter is equal to or higher than a given regeneration starting amount, the controller starts a PM filter regeneration control in which the fine particulate matter captured by the PM filter is removed from the PM filter. After the PM filter regeneration control is started and when the accumulation amount of the fine particulate matter in the PM filter decreases by a given amount, the controller starts a $NO_x$ catalyst regeneration control in which the controller controls the amount of the fuel injected from the injector so as to switch between a first state in which an air-fuel ratio of the exhaust gas equal to or smaller than a stoichiometric air-fuel ratio and a second state in which the air-fuel ratio of the exhaust gas is higher than the stoichiometric air-fuel ratio.

According to another aspect of the present disclosure, a control device for an engine is provided, the engine including, in an exhaust passage thereof, an oxidation catalyst configured to oxidize unburned fuel in exhaust gas, a $NO_x$ catalyst provided integrally with the oxidation catalyst or downstream of the oxidation catalyst and configured to store $NO_x$ within the exhaust gas introduced to the $NO_x$ catalyst in a lean state in which an air-fuel ratio of the exhaust gas is lean and to reduce the stored $NO_x$ in a rich state in which the air-fuel ratio is equal to a stoichiometric air-fuel ratio or rich, and a particulate matter (PM) filter provided downstream of the oxidation catalyst and configured to capture fine particulate matter within the exhaust gas. The control device includes a processor configured to execute a $NO_x$ catalyst regeneration control module to perform a $NO_x$ catalyst regeneration control to remove sulfur components stored in the $NO_x$ catalyst by switching between the rich state and the lean state in which the unburned fuel is introduced to the oxidation catalyst, and a PM filter regeneration control module to perform a PM filter regeneration control to remove the captured fine particulate matter from the PM filter by bringing the air-fuel ratio of the exhaust gas introduced to the PM filter to be lean and introducing the unburned fuel to the oxidation catalyst. When an accumulation amount of the fine particulate matter is equal to or larger than a given regeneration starting amount, the PM filter regeneration control module starts the PM filter regeneration control. Thereafter, before the accumulation amount of the fine particulate matter decreases to be equal to or smaller than a regeneration ending amount that is smaller than the given regeneration starting amount, the $NO_x$ catalyst regeneration control module starts the $NO_x$ catalyst regeneration control.

According to this configuration, since the $NO_x$ catalyst regeneration control starts after the PM filter regeneration control starts and before the accumulation amount of the fine particulate matter decreases to be equal to or smaller than the regeneration ending amount, a period of time for the $NO_x$ catalyst being subjected to high temperature conditions is limited. Consequently, coagulation of an occluding agent carried by the $NO_x$ catalyst is inhibited, thus avoiding the situation in which sulfur components hardly react with the reducing agent. This facilitates removal of the sulfur components from the $NO_x$ catalyst and enables the $NO_x$ catalyst to recover from sulfur poisoning efficiently, in the $NO_x$ catalyst regeneration control.

Furthermore, the $NO_x$ catalyst regeneration control is executed after removal of a given amount of the fine particulate matter accumulation in the PM filter, thus inhibiting an abnormal combustion of the PM filter during the $NO_x$ catalyst regeneration control.

The reason for this is as follows. The unburned fuel is likely to adhere to the PM filter in the rich state during the $NO_x$ catalyst regeneration control and is likely to react with oxygen supplied in the lean state, resulting in a rise in the temperature of the PM filter. If there is a large amount of fine particulate matter accumulation in the PM filter, chain-reaction combustion of the fine particulate matter may be accelerated due to the rise in the temperature of the PM filter, and the temperature of the PM filter may be elevated excessively. According to this configuration, since the $NO_x$ catalyst regeneration control is executed after the fine particulate matter accumulation amount in the PM filter is reduced to some extent, an excessive rise in the temperature of the PM filter during the $NO_x$ catalyst regeneration control is inhibited.

Further, since the regeneration of the PM filter is possible in the lean state during the $NO_x$ catalyst regeneration control, the regeneration of the PM filter and the regeneration of the $NO_x$ catalyst can be performed simultaneously. This is advantageous in view of fuel consumption.

The $NO_x$ catalyst regeneration control module may start the $NO_x$ catalyst regeneration control when the PM filter is heated to a temperature of 600° C. or higher during the PM filter regeneration control.

According to this configuration, the $NO_x$ catalyst regeneration control is started when the PM filter is heated to 600° C. or higher, that is, after a lapse of a comparatively short period of time subsequent to the start of the PM filter regeneration control, and thus, the $NO_x$ catalyst is subjected to high temperature conditions for a limited amount of time. Consequently, coagulation of the occluding agent in the $NO_x$ catalyst is inhibited, thus further reliably avoiding the situation in which the sulfur components hardly react with the reducing agent.

The $NO_x$ catalyst regeneration control module may start the $NO_x$ catalyst regeneration control when the accumulation amount of the fine particulate matter decreases by a given amount from the regeneration starting amount during the PM filter regeneration control.

According to this configuration, the $NO_x$ catalyst regeneration control is started when the accumulation amount of the fine particulate matter decreases by a given amount, that is, after the start of the PM filter regeneration control, and thus, the $NO_x$ catalyst is subjected to the high temperature condition for a limited amount of time. Also by this, coagulation of the occluding agent in the $NO_x$ catalyst is inhibited, thus avoiding the situation in which the sulfur components hardly react with the reducing agent.

In addition, the $NO_x$ catalyst regeneration control is executed after the given amount of the fine particulate matter is removed, thus inhibiting the excessive rise in the temperature of the PM filter.

The given amount may be 50% or less of the regeneration starting amount.

According to this configuration, the $NO_x$ catalyst regeneration control is started after the start of the PM filter regeneration control and at least before the accumulation amount of the fine particulate matter decreases to be less than 50%, and thus, coagulation of the occluding agent in the $NO_x$ catalyst is inhibited.

The given amount may be 10% or more of the regeneration starting amount.

According to this configuration, the $NO_x$ catalyst regeneration control is started after the start of the PM filter regeneration control and after the accumulation amount of the fine particulate matter is removed to 10% or more, thus inhibiting the excessive rise in the temperature of the PM filter in the $NO_x$ catalyst regeneration control.

The control device may further include a $NO_x$ catalyst rich purge control module configured to perform a $NO_x$ catalyst rich purge control to reduce $NO_x$ stored in the $NO_x$ catalyst by bringing the air-fuel ratio to be rich. The PM filter regeneration control module may start the PM filter regeneration control immediately after the $NO_x$ catalyst rich purge control is terminated.

According to this configuration, in the $NO_x$ catalyst rich purge control, by the heat generated by the oxidation of unburned fuel in the oxidation catalyst, the temperature of the PM filter disposed downstream thereof is maintained at a high temperature. Thus, executing the PM filter regeneration control immediately after the $NO_x$ catalyst rich purge control is terminated makes the temperature of the PM filter easily increase early to a temperature at which the fine particulate matter is removable. This can reduce the amount of the unburned fuel to be supplied to increase the temperature of the PM filter.

A method of controlling an engine is provided, the engine including, in an exhaust passage thereof, an oxidation catalyst configured to oxidize unburned fuel in exhaust gas, a $NO_x$ catalyst provided integrally with the oxidation catalyst or downstream of the oxidation catalyst and configured to store $NO_x$ within the exhaust gas introduced to the $NO_x$ catalyst in a lean state in which an air-fuel ratio of the exhaust gas is lean and to reduce the stored $NO_x$ in a rich state in which the air-fuel ratio is equal to a stoichiometric air-fuel ratio or rich, and a particulate matter (PM) filter provided downstream of the oxidation catalyst and configured to capture fine particulate matter within the exhaust gas. The method includes regenerating the $NO_x$ catalyst through removal of sulfur components stored in the $NO_x$ catalyst by switching between the rich state and the lean state in which the unburned fuel is introduced to the oxidation catalyst, and regenerating the PM filter through removal of the captured fine particulate matter from the PM filter by bringing the air-fuel ratio of the exhaust gas introduced to the PM filter to be lean and introducing the unburned fuel to the oxidation catalyst. When an accumulation amount of the fine particulate matter is equal to or larger than a given regeneration starting amount, the regenerating of the PM filter is started, and thereafter, before the accumulation amount of the fine particulate matter decreases to be equal to or smaller than a regeneration ending amount that is smaller than the given regeneration starting amount, the regenerating of the $NO_x$ catalyst is started.

According to this method, the sulfur poisoning of the $NO_x$ catalyst is efficiently eliminated while efficiently removing the fine particulate matter from the PM filter.

DETAILED DESCRIPTION OF THE DISCLOSURE

Hereinafter, a control device for an engine according to one embodiment of the present disclosure is described with reference to the accompanying drawings.

(1) Overall Configuration

Figure 1:
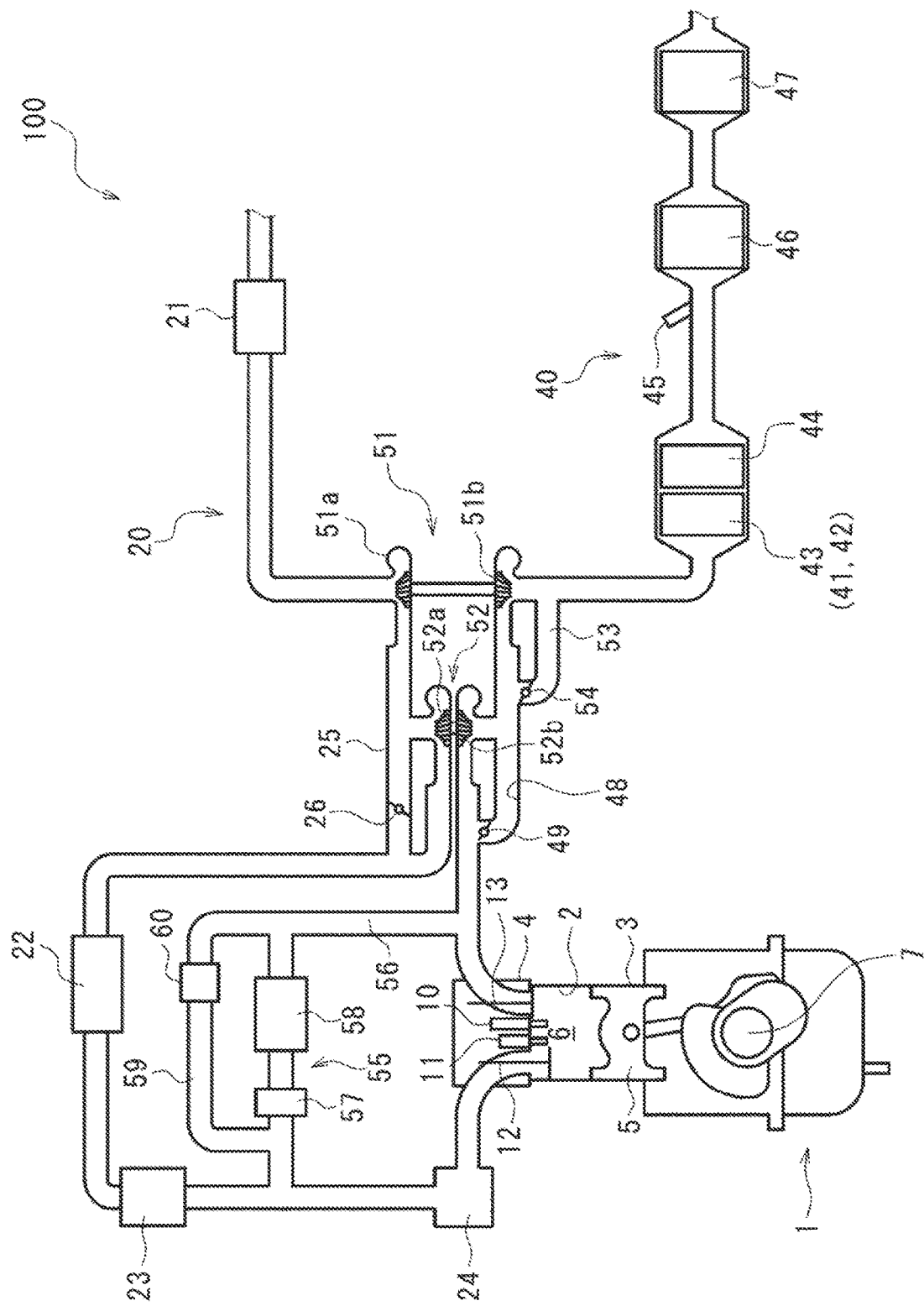
FIG. 1 is a schematic configuration view of an engine system to which a control device for an engine according to one embodiment of the present disclosure is applied.

FIG. 1 is a schematic configuration view of an engine system 100 to which a control device for an engine according to this embodiment is applied.

The engine system 100 includes a four-stroke engine body 1, an intake passage 20 which introduces air (intake air) into the engine body 1, an exhaust passage 40 through which exhaust gas is discharged from the engine body 1 to the outside, a first turbocharger 51, and a second turbocharger 52. The engine system 100 is provided in a vehicle, and the engine body 1 is used as a drive source of the vehicle. The engine body 1 is, for example, a diesel engine and includes four cylinders 2 arranged in a direction orthogonal to the sheet of FIG. 1.

The engine body 1 includes a cylinder block 3 provided with the cylinders 2 formed therein, a cylinder head 4 provided on an upper surface of the cylinder block 3, and pistons 5 fitted into the respective cylinders 2 which permit reciprocating sliding motions of the pistons 5. A combustion chamber 6 is formed on each piston 5.

Each piston 5 is coupled to a crankshaft 7 and the crankshaft 7 rotates about its center axis according to the reciprocating motion of the piston 5.

The cylinder head 4 is provided with injectors 10 and glowplugs 11, each injector 10 and each glowplug 11 provided in a pair for each cylinder 2. The injector 10 injects fuel into the combustion chamber 6 (into the cylinder 2) and the glowplug 11 elevates the temperature of a mixture gas containing the fuel and air inside the combustion chamber 6.

In the example of FIG. 1, the injector 10 is provided at a center of a ceiling surface of the combustion chamber 6 so as to be oriented downwardly toward the combustion chamber 6. The glowplug 11 has at its tip end a heat generating part which generates heat by being energized, and the glowplug 11 is attached to the ceiling surface of the combustion chamber 6 so that its heating generating part is located close to a tip part of the injector 10. For example, the injector 10 has a plurality of nozzle ports at its tip end, and the glowplug 11 is disposed so that when the fuel is injected from the nozzle ports in form of fuel spray, its heat generating part is located between fuel sprays from the adjacent nozzle ports of the injector 10 and does not come into direct contact with the fuel sprays.

The injector 10 performs a main injection which is mainly carried out to obtain an engine torque and in which the fuel is injected into the combustion chamber 6 so as to combust near a top dead center on compression stroke (CTDC), and a post injection in which the fuel is injected into the combustion chamber 6 at a timing later than the main injection and at which, even when the injected fuel combusts, a combustion energy thereof scarcely contributes to the engine torque.

The cylinder head 4 is formed with an intake port which introduces the air supplied from the intake passage 20 into the combustion chamber 6 of each cylinder 2, an intake valve 12 which opens and closes the intake port, an exhaust port which leads the exhaust gas generated inside the combustion chamber 6 of each cylinder 2 out to the exhaust passage 40, and an exhaust valve 13 which opens and closes the exhaust port.

In the intake passage 20, an air cleaner 21, a compressor 51a (hereinafter also referred to as "first compressor 51a") of the first turbocharger 51, a compressor 52a (hereinafter also referred to as "second compressor 52a") of the second turbocharger 52, an intercooler 22, a throttle valve 23, and a surge tank 24 are provided in the order from an upstream side. An intake bypass passage 25 which bypasses the second compressor 52a and an intake bypass valve 26 which opens and closes the intake bypass passage 25 are also provided in the intake passage 20. The intake bypass valve 26 is switched between a fully closed state and a fully opened state by a drive device (not illustrated).

In the exhaust passage 40, provided are, in the order from the upstream side, a turbine 52b (hereinafter also referred to as "second turbine 52b") of the second turbocharger 52, a turbine 51b (hereinafter also referred to as "first turbine 51b") of the first turbocharger 51, a first catalyst 43, a diesel particulate filter (DPF, one example of a PM filter) 44, a urea injector 45 which injects urea into the exhaust passage 40 downstream of the DPF 44, a selective catalytic reduction (SCR) catalyst 46 which purifies $NO_x$ by using urea injected from the urea injector 45, and a slip catalyst 47 which purifies non-reacted ammonia released from the SCR catalyst 46 by oxidizing it.

The SCR catalyst 46 hydrolyzes the urea injected from the urea injector 45 to generate ammonia, and purifies this ammonia by causing a reaction (reducing it) with $NO_x$ within the exhaust gas.

Figure 2:
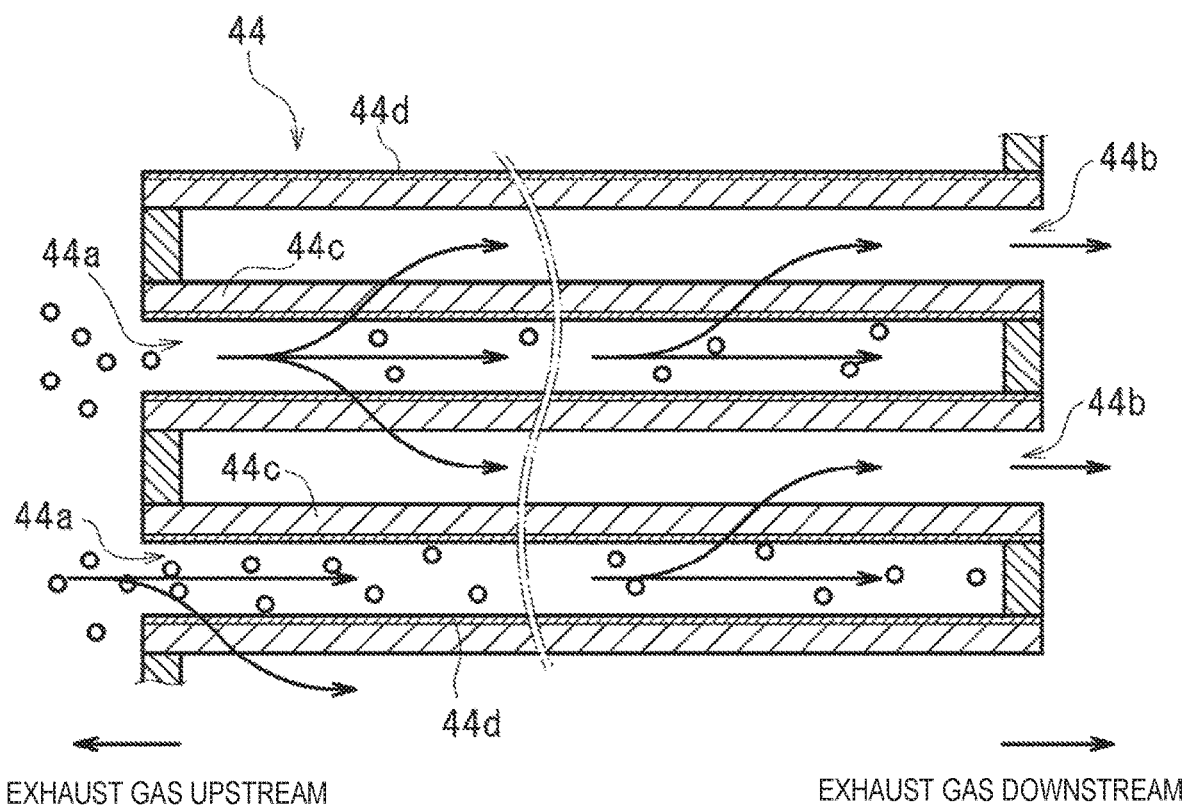
FIG. 2 is a view schematically illustrating a diesel particulate filter (DPF).

The DPF 44 captures fine particulate matter (PM) within the exhaust gas. FIG. 2 is a cross-sectional view taken along an exhaust gas channel and schematically illustrates the DPF 44. The DPF 44 is, for example, a porous ceramic filter including a number of passages formed therein in a grid pattern and provided with passages 44a and passages 44b alternately disposed in a staggered pattern. Each passage 44a is open on the upstream side of the exhaust path and closed on the downstream side of the exhaust path, whereas each passage 44b is closed on the upstream side of the exhaust path and open on the downstream side of the exhaust path. After entering the passages 44a, the exhaust gas passes through partitions 44c separating the adjacent passages and goes into the passages 44b. The partitions 44c function as a filter which prevents fine particulate matter from going into the passages 44b and capture the fine particulate matter.

Each partition 44c of the DPF 44 is covered with an oxidation catalyst layer 44d. The oxidation catalyst layer 44d stores (adsorbs), for example, hydrocarbon (HC), namely, unburned fuel and carbon monoxide (CO), which are converted into water and carbon dioxide by oxidation due to oxygen within the exhaust gas. This oxidation reaction occurring in the oxidation catalyst layer 44*d* is an exothermic reaction. When the oxidation reaction occurs in the oxidation catalyst layer 44*d*, the temperature of the exhaust gas is elevated.

The PM captured by the DPF 44 combusts by being exposed to elevated temperatures and receiving a supply of oxygen, and thus, is removed from the DPF 44. The temperature at which the PM combusts efficiently to be removed from the DPF 44 is comparatively as high as 600° C. Therefore, in order to remove the PM from the DPF 44 by combustion, the DPF 44 needs to be heated to comparatively high temperatures.

The first catalyst 43 contains a $NO_x$ catalyst 41 which purifies $NO_x$ and an oxidation catalyst (e.g., diesel oxidation catalyst: DOC) 42.

The oxidation catalyst 42 oxidizes, for example, hydrocarbons (HC), namely, unburned fuel and carbon monoxide (CO) by using oxygen within the exhaust gas, to convert them into water and carbon dioxide. This oxidation reaction occurring in the oxidation catalyst 42 is an exothermic reaction. When the oxidation reaction occurs in the oxidation catalyst 42, the temperature of the exhaust gas is elevated.

Figure 3A:
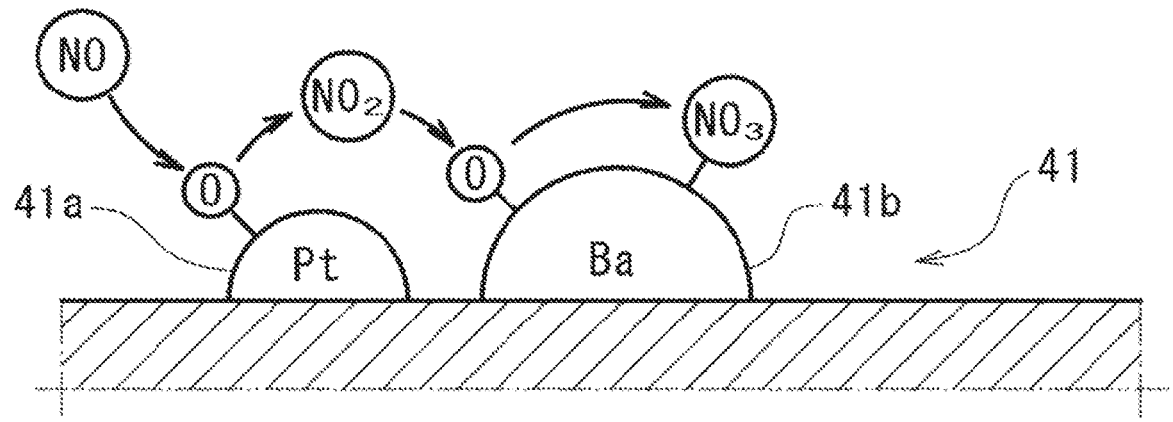
FIGS. 3A and 3B are conceptual views illustrating adsorption of $NO_x$ and $SO_x$ to a $NO_x$ catalyst.
Figure 3B:
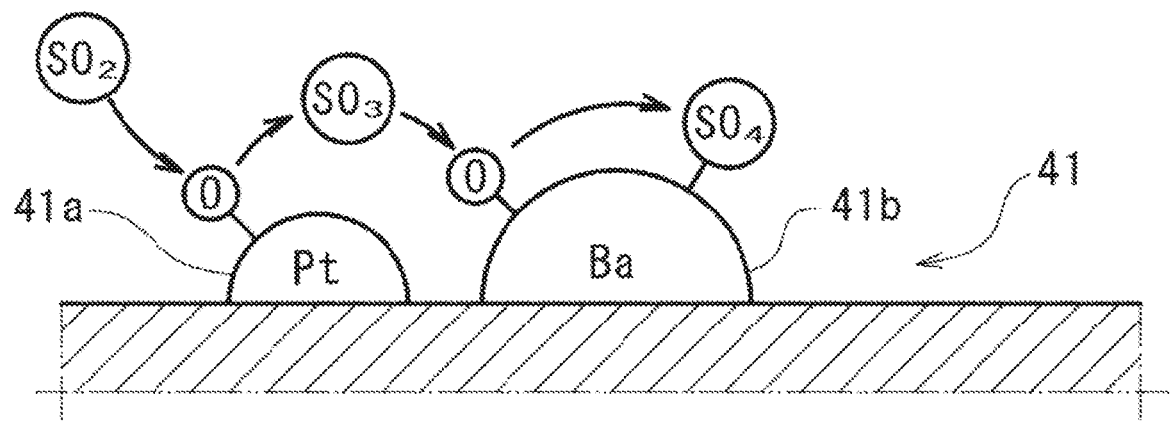

As schematically illustrated in FIG. 3A, the $NO_x$ catalyst 41 carries catalytic metal 41*a*, which may be a noble metal such as platinum (Pt) or rhodium (Rh). The $NO_x$ catalyst 41 carries an occluding agent 41*b*, which may be an alkaline earth metal, an alkali metal, or a rare earth metal. More specifically, the occluding agent 41*b* is, for example, barium (Ba), strontium (Sr), or magnesium (Mg). When an air-fuel ratio of the exhaust gas is lean (that is, higher than a stoichiometric air-fuel ratio, i.e., an air excess ratio $\lambda 1$), $NO_x$ within the exhaust gas is oxidized by the catalytic metal 41*a* and stored (occluded) by the occluding agent 41*b*. As illustrated in FIG. 3B, in the $NO_x$ catalyst 41, when the air-fuel ratio of the exhaust gas is lean, $SO_x$ within the exhaust gas is also oxidized by the catalytic metal 41*a* and occluded by the occluding agent 41*b*.

$NO_x$ and $SO_x$ stored in the $NO_x$ catalyst are released and reduced when the air-fuel ratio of the exhaust gas is close to the stoichiometric air-fuel ratio ($\lambda \approx 1$) or rich (that is, lower than the stoichiometric air-fuel ratio ($\lambda < 1$)), i.e., in a reduction atmosphere in which the exhaust gas passing through the $NO_x$ catalyst 41 contains a large amount of unburned HC. Thus, the $NO_x$ catalyst 41 is a $NO_x$ storage catalyst (NSC). The first catalyst 43 is formed by, for example, coating a surface of a catalyst material layer of the DOC with a catalyst material of the NSC.

Note that in this embodiment, no device for supplying air or fuel to the exhaust passage is separately provided, and the air-fuel ratio of the exhaust gas corresponds to the air-fuel ratio of the mixture gas inside the combustion chamber 6. In other words, when the air-fuel ratio of the mixture gas inside the combustion chamber 6 is lean, the air-fuel ratio of the exhaust gas also becomes lean, and when the air-fuel ratio of the mixture gas inside the combustion chamber 6 is close to the stoichiometric air-fuel ratio ($\lambda \approx 1$) or rich ($\lambda < 1$), the air-fuel ratio of the exhaust gas is also close to the stoichiometric air-fuel ratio or rich. Therefore, hereinafter, only the air-fuel ratio of the mixture gas may be referred to even when a statement applies to both the air-fuel ratio of the exhaust gas and the air-fuel ratio of the mixture gas.

Although the SCR catalyst 46 and the $NO_x$ catalyst 41 are both capable of purifying $NO_x$, temperatures at which their purification ratios ($NO_x$ storage ratios) increase are different. The $NO_x$ purification ratio ($NO_x$ storage ratio) of the SCR catalyst 46 increases when the temperature of the exhaust gas is comparatively high, and the $NO_x$ purification ratio of the $NO_x$ catalyst 41 increases when the temperature of the exhaust gas is comparatively low.

As illustrated in FIG. 1, an exhaust bypass passage 48 which bypasses the second turbine 52*b*, an exhaust bypass valve 49 which opens and closes the exhaust bypass passage 48, a wastegate passage 53 which bypasses the first turbine 51*b*, and a wastegate valve 54 which opens and closes the wastegate passage 53 are provided in the exhaust passage 40. Each of the exhaust bypass valve 49 and the wastegate valve 54 is switched between a fully closed state and a fully opened state by a drive device (not illustrated), and is controlled to have an arbitrary opening between these states.

The engine system 100 of this embodiment includes an exhaust gas recirculation (EGR) device 55 which recirculates a portion of the exhaust gas to the intake air. The EGR device 55 includes an EGR passage 56 connecting a part of the exhaust passage 40 upstream of an upstream end of the exhaust bypass passage 48 to a part of the intake passage 20 between the throttle valve 23 and the surge tank 24, a first EGR valve 57 which opens and closes the EGR passage 56, and an EGR cooler 58 which cools the exhaust gas passing through the EGR passage 56. The EGR device 55 includes an EGR cooler bypass passage 59 which bypasses the EGR cooler 58 and a second EGR valve 60 which opens and closes the EGR cooler bypass passage 59.

(2) Control Part

Figure 4:
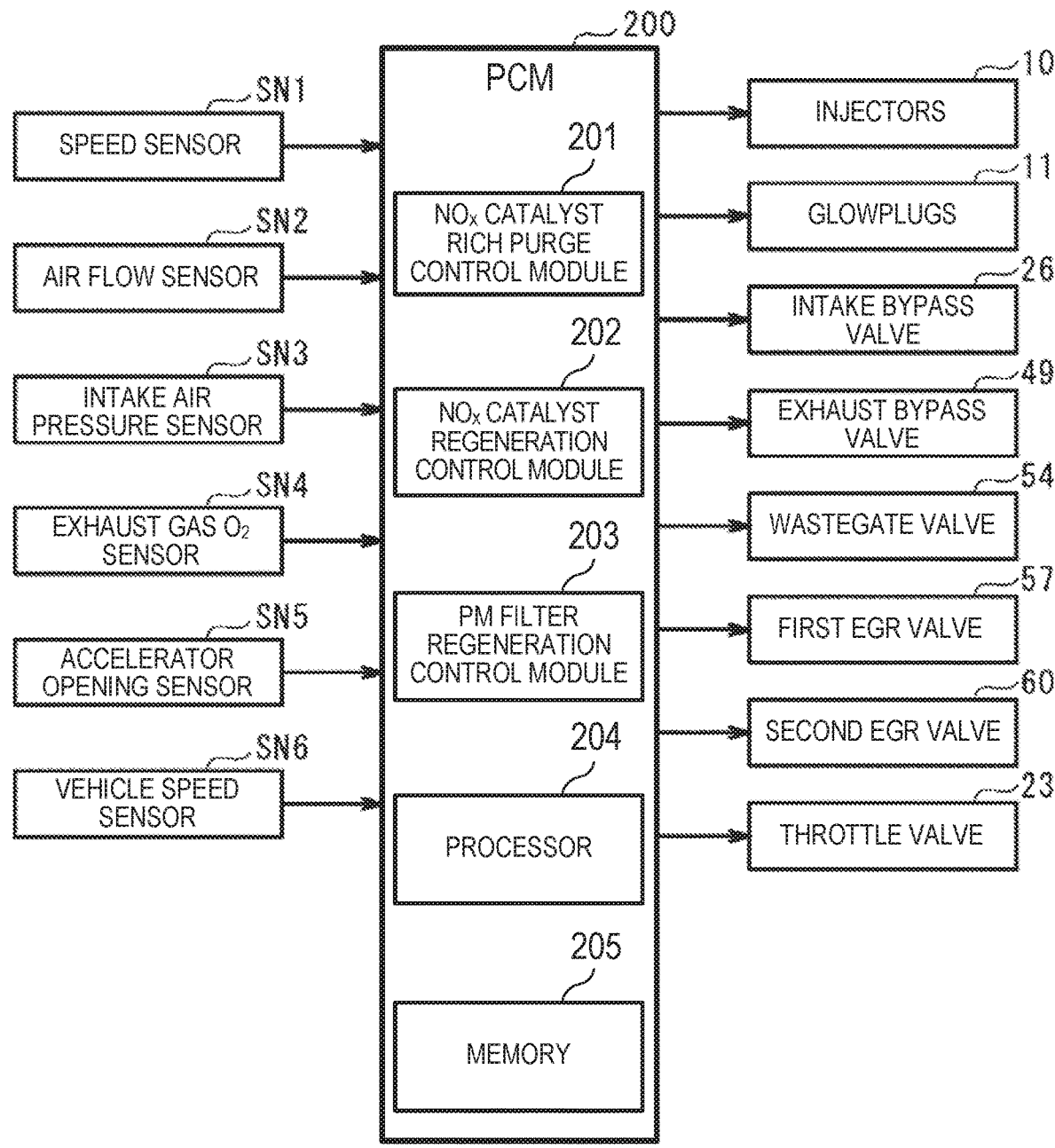
FIG. 4 is a block diagram illustrating a control part of the engine system.

A control part of the engine system is described with reference to FIG. 4. The engine system 100 of this embodiment is mainly controlled by a powertrain control module (PCM, controller) 200 mounted on the vehicle. The PCM 200 is a microprocessor including, for example, a processor 204 (e.g., a central processing unit (CPU)), memory 205 (e.g., ROM(s) and RAM(s)), and an interface (I/F). The PCM 200 includes a $NO_x$ catalyst rich purge control module 201, a $NO_x$ catalyst regeneration control module 202, and a PM filter regeneration control module 203 which perform, as will be described later, a $DeNO_x$ control ($NO_x$ catalyst rich purge control), a $DeSO_x$ control ($NO_x$ catalyst regeneration control), and a DPF regeneration control (PM filter regeneration control), respectively. The processor 204 is configured to execute these modules to perform their respective functions. These modules are stored in the memory 205 as software.

The PCM 200 receives information from various sensors. For example, the PCM 200 is electrically connected to, for example, a speed sensor SN1 which detects a rotational speed of the crankshaft 7, i.e., an engine speed, an airflow sensor SN2 which is provided near the air cleaner 21 and detects an intake air amount, i.e., an amount of fresh air (air) flowing through the intake passage 20, an intake air pressure sensor SN3 which is provided in the surge tank 24 and detects the pressure of the intake air inside the surge tank 24 after being turbocharged by the turbochargers 51 and 52, i.e., a turbocharging pressure, and an exhaust gas $O_2$ sensor SN4 which detects an oxygen concentration in a section of the exhaust passage 40 between the first turbocharger 51 and the first catalyst 43. Input signals from the sensors SN1 to SN4 are inputted to the PCM 200. The vehicle is provided with an accelerator opening sensor SN5 which detects an accelerator opening being an opening of an accelerator pedal (not illustrated) which is operated by a vehicle driver, a vehicle speed sensor SN6 which detects a vehicle speed, etc., and detection signals from the sensors SN5 and SN6 are also inputted to the PCM 200. The PCM 200 executes, for example, various calculations based on the input signals from the various sensors (SN1 to SN6, etc.) to control the injector 10, etc.

(2-1) Normal Control

In a normal control executed during a normal operation in which the $DeNO_x$ control, the $DeSO_x$ control, and the DPF regeneration control are not executed, in order to improve the fuel efficiency, the air-fuel ratio of the mixture gas inside the combustion chamber 6 (hereinafter, also simply referred to as "the air-fuel ratio of the mixture gas") is set to be lean ($\lambda>1$, e.g., $\lambda\approx1.7$). Moreover, in the normal control, the post injection is stopped and only the main injection is performed. The operation of the glowplugs 11 is stopped in the normal control. Additionally, in the normal control, the first EGR valve 57, the second EGR valve 60, the intake bypass valve 26, the exhaust bypass valve 49, and the wastegate valve 54 are controlled so that an EGR ratio and the turbocharging pressure stand at appropriate values according to an operating state of the engine body 1 such as an engine speed and an engine load.

(2-2) $DeNO_x$ Control

The following describes the $DeNO_x$ control ($NO_x$ catalyst rich purge control) which is performed by the $NO_x$ catalyst rich purge control module 201 in order to release (remove) $NO_x$ stored in the $NO_x$ catalyst 41 (hereinafter, also referred to as "stored $NO_x$") from the $NO_x$ catalyst 41.

As described above, in the NO catalyst 41, the stored NO is reduced when the air-fuel ratio of the exhaust gas is close to the stoichiometric air-fuel ratio ($\lambda\approx1$) or rich ($\lambda<1$). In other words, in order to reduce the stored $NO_x$, the air-fuel ratios of the exhaust gas and the mixture gas need to be lower than the air-fuel ratios during the normal operation (during execution of the normal control).

As a method for lowering the air excess ratio $\lambda$ of the mixture gas, the amount of fresh air (air) introduced into the combustion chamber 6 may be reduced. However, simply reducing the amount of fresh air may result in a failure in obtaining an appropriate engine torque. In particular, reducing the amount of fresh air during acceleration may degrade acceleration performance. In addition, adjusting the amount of fresh air makes it comparatively difficult to accurately control the air excess ratio $\lambda$ of the mixture gas.

Thus, in this embodiment, the post injection is performed to lower the air-fuel ratio of the mixture gas with little to no decrease in the amount of fresh air. In other words, the PCM 200 (executing the $NO_x$ catalyst rich purge control module 201) causes the injectors 10 to perform the post injection in addition to the main injection so as to lower the air-fuel ratio of the exhaust gas. For example, in the $DeNO_x$ control, the air excess ratio $\lambda$ of the mixture gas is set to about 0.94 to 1.06.

Figure 5:
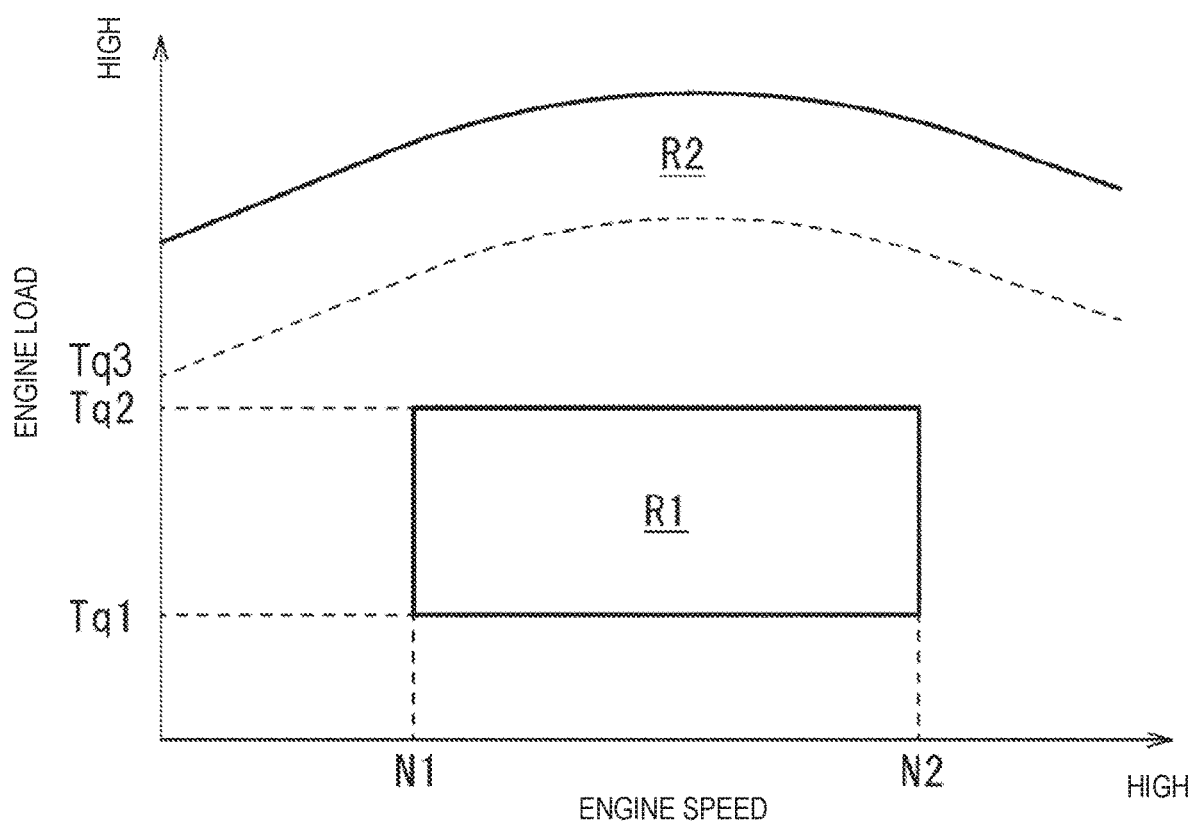
FIG. 5 is a chart illustrating a control map of a passive $DeNO_x$ control and an active $DeNO_x$ control.

In this embodiment, the $DeNO_x$ control in which the post injection is performed to reduce the stored $NO_x$ is executed only within a first range R1 and a second range R2 illustrated in FIG. 5. Within the first range R1, the engine speed is between a given first reference speed N1 and a given second reference speed N2, and the engine load is between a given first reference load Tq1 and a given second reference load Tq2. The engine load within the second range R2 is higher than the engine load within the first range R1 and equal to or higher than a given third reference load Tq3.

Within the first range R1, the PCM 200 (executing the $NO_x$ catalyst rich purge control module 201) performs an active $DeNO_x$ control in which the post injection is performed at a timing at which the fuel injected in the post injection (hereinafter, referred to as "post-injected fuel") combusts inside the combustion chamber 6. The injection timing of the post injection is set in advance, for example, to a timing between 30 and 70° CA after the CTDC in an early half of expansion stroke. In this embodiment, in the active $DeNO_x$ control, the glowplugs 11 are energized to heat the mixture gas in order to accelerate the combustion of the post-injected fuel.

In the active $DeNO_x$ control, the EGR gas is introduced into the combustion chamber 6 and each of the first and second EGR valves 57 and 60 is opened to a degree lower than the degree of opening set during the normal operation (is set closer to the closed state), that is, lower than the degree of opening set in a case if the active $DeNO_x$ control is not executed. In this embodiment, in the active $DeNO_x$ control, the first EGR valve 57 is fully closed and the second EGR valve 60 is opened to a degree lower than the degree of opening set during the normal operation.

This is for accelerating the combustion of the post-injected fuel while reducing the amount of soot generated by this combustion. For example, when the post-injected fuel combusts, not only the EGR gas but also combusted gas resulting from the main injection is present within the combustion chamber 6. Therefore, when a large amount of EGR gas is introduced, the mixing of the post-injected fuel and air becomes insufficient and a large amount of soot may be generated. Additionally, the post injection is performed at a timing when the temperature and pressure inside the combustion chamber 6 are comparatively low, and thus, combustion stability is likely to degrade. For this reason, in the active $DeNO_x$ control, the first EGR valve 57 is closed to stop the introduction of low-temperature EGR gas having passed through the EGR cooler 58 and the second EGR valve 60 is opened to introduce high-temperature EGR gas as described above, thereby accelerating the combustion of the post-injected fuel while improving the combustion stability. Furthermore, the second EGR valve 60 is opened to a degree lower than the degree of opening set during the normal operation, thereby reducing the amount of soot generated.

Specifically, the PCM 200 stores, in maps of the engine speed, the engine load, etc., the degree of opening of the first and second EGR valves 57 and 60 set during the active $DeNO_x$ control as well as the degree of openings of the first and second EGR valves 57 and 60 set during the normal operation. The PCM 200 (executing the $NO_x$ catalyst rich purge control module 201) sets the degree of opening of each of the first and second EGR valves 57 and 60 by extracting values from the map corresponding to the control in execution. For the same engine speed, engine load, etc., the values in the map for the active $DeNO_x$ control are lower than the values in the map for the normal control.

Within the second range R2, meanwhile, the PCM 200 (executing the $NO_x$ catalyst rich purge control module 201) performs a passive $DeNO_x$ control in which the post injection is performed at a timing at which the post-injected fuel does not combust inside the combustion chamber 6 (in a latter half of the expansion stroke, e.g., 100 to 120° CA after the CTDC). In the passive $DeNO_x$ control, the first and second EGR valves 57 and 60 are both fully closed in order to avoid the EGR cooler 58, etc. from being blocked by a deposit of unburned post-rejected fuel.

As described above, the $DeNO_x$ controls in the first and second ranges R1 and R2 are set to be different from each other for the following reasons.

Within an operating range where the engine load is low or an operating range where the engine load is comparatively high and the engine speed is low, the temperature of the exhaust gas is low, and accordingly, the temperature of the $NO_x$ catalyst 41 is likely to fall below the temperatures at which the stored $NO_x$ is reducible. Therefore, in this embodiment, the $DeNO_x$ control is stopped within this range.

Moreover, the post injection is performed in the $DeNO_x$ control as described above. If the post-injected fuel is discharged to the exhaust passage 40 as it is without combusting, the deposit of this unburned fuel may block the EGR cooler 58, etc. Therefore, the post-injected fuel preferably combusts inside the combustion chamber 6. However, within an operating range where the engine load is high or an operating range where the engine load is comparatively low and the engine speed is high, the temperature inside the combustion chamber 6 is high or a time length corresponding to one degree of crank angle is short, and thus, it is difficult to sufficiently mix the post-injected fuel with air before the gas inside the combustion chamber 6 is discharged. Consequently, the post-injected fuel may not sufficiently combust in the combustion chamber 6. Furthermore, the insufficient mixing may cause an increase in the amount of soot generated. Therefore, the $DeNO_x$ control is basically stopped within this range.

Note that within the second range R2 where the engine load is extremely high, the injection amount for the main injection (hereinafter may be referred to as "main injection amount") is large, and thus, the air-fuel ratio of the mixture gas is kept low even during the normal operation. Thus, within the second range R2, the injection amount for the post injection (hereinafter may be referred to as "post injection amount") required for reducing the stored $NO_x$ is decreased so that the above-described disadvantage of discharging the unburned fuel to the exhaust passage 40 is reduced.

Therefore, in this embodiment, within the first range R1 where each of the engine load and the engine speed is neither at an excessively low level nor at an excessively high level, the active $DeNO_x$ control in which the post-injected fuel combusts inside the combustion chamber 6 is executed, and within the second range R2, the passive $DeNO_x$ control in which the post-injected fuel does not combust inside the combustion chamber 6 is executed. Note that within the second range R2, the temperature of the exhaust gas is sufficiently high and the oxidation catalyst 42 is sufficiently activated. Therefore, the unburned fuel discharged to the exhaust passage 40 is purified by the oxidation catalyst 42. In addition, the $DeNO_x$ control is permitted only within the operating range where the engine speed and engine load are at medium levels as described above, thus providing ensured combustion stability of the post injection during the $DeNO_x$ control and preventing degradation of exhaust performance.

The execution of the active $DeNO_x$ control and the passive $DeNO_x$ control are respectively permitted when the temperature of the SCR catalyst 46 is lower than a given temperature, the temperature of the $NO_x$ catalyst 41 is higher than a given temperature, and the stored $NO_x$ amount which is the amount of $NO_x$ stored in the $NO_x$ catalyst 41 is larger than a given amount. Note that as described above, the active $DeNO_x$ control is executed exclusively when the engine body 1 is operated within the first range R1, and the passive $DeNO_x$ control is executed exclusively when the engine body 1 is operated within the second range R2. In this embodiment, the minimum value of the stored $NO_x$ amount required to permit execution of the passive $DeNO_x$ control is set to be lower than the minimum value of the stored $NO_x$ amount required to permit execution of the active $DeNO_x$ control.

In this embodiment, as will be described later, in a case where the DPF regeneration control is started in a state where the engine body 1 is operated in the first range R1, the active $DeNO_x$ control is executed prior to the DPF regeneration control. Alternatively, when the stored $NO_x$ amount is extremely large, the active $DeNO_x$ control may be executed regardless of whether the DPF regeneration control is executed. Even in this case, the active $DeNO_x$ control is executed when the engine body 1 is operated within the first range R1. Moreover, if the SCR catalyst 46 is heated to temperatures at which purification of $NO_x$ by the SCR catalyst 46 is possible, the active $DeNO_x$ control is not executed. Additionally, if the $NO_x$ catalyst 41 is not heated to the temperature at which reduction of the stored $NO_x$ is possible, the active $DeNO_x$ control is not executed.

The temperature of the $NO_x$ catalyst 41 is estimated based on, for example, the temperature detected by the temperature sensor disposed immediately upstream of the $NO_x$ catalyst 41. The temperature of the SCR catalyst 46 is estimated based on, for example, the temperature detected by the temperature sensor disposed immediately upstream of the SCR catalyst 46. The stored $NO_x$ amount is estimated, for example, by adding up the $NO_x$ amounts in the exhaust gas which are estimated based on the operating state of the engine body 1, the flow rate, and the temperature of the exhaust gas, etc.

(2-3) DPF Regeneration Control

In this embodiment, the PM filter regeneration control module 203 performs the DPF regeneration control (PM filter regeneration control) for restoring the purification capability of the DPF 44 by removing PM captured by the DPF 44.

The DPF regeneration control is started when the oxidation catalyst 42 reaches a given temperature at which the oxidation reaction is possible and when the amount of PM captured by the DPF 44 (hereinafter simply referred to as "PM accumulation amount") reaches a given regeneration starting amount. The PM accumulation amount is calculated, for example, based on a difference in pressure between the upstream side and the downstream side of the DPF 44 which is calculated by pressure sensors disposed on the upstream side and the downstream side of the DPF 44. The regeneration starting amount is set to a value obtained by deducting a given amount from the largest possible accumulation amount of PM captured by the DPF 44.

As described above, the PM captured by DPF 44 can be combusted and removed under high temperature conditions. In this regard, an oxidation reaction of the unburned fuel such as HC in the oxidation catalyst 42 contained in the first catalyst 43 provided on the upstream side of the DPF 44 causes a rise in the temperature of the exhaust gas flowing into the DPF 44 and, in turn, causes a rise in the temperature of the DPF 44. Furthermore, an oxidation reaction of the unburned fuel in the oxidation catalyst layer 44*d* of the DPF 44 also helps elevate the temperature of the DPF 44.

Thus, this embodiment involves, as the DPF regeneration control, the control in which with the air-fuel ratio of the mixture gas being lean, the post injection is performed so that air and the unburned fuel are led into the oxidation catalyst 42 and oxidized thereby. Specifically, in the DPF regeneration control, the post injection is performed at the timing at which the post-injected fuel does not combust inside the combustion chamber 6 (in the latter half of the expansion stroke, e.g., 100 to 120° CA after the CTDC). For example, in the DPF regeneration control, the air excess ratios λ of the mixture gas and the exhaust gas are set to about 1.2 to 1.4.

Moreover, in the DPF regeneration control, the first and second EGR valves 57 and 60 are fully closed so as to prevent the unburned fuel from flowing into the EGR passage 56 and the EGR cooler 58 and blocking them. Additionally, the energization of the glowplugs 11 is stopped because the DPF regeneration control does not require combustion of the post-injected fuel.

(2-4) DeSO$_x$ Control

The following describes the DeSO$_x$ control (NO$_x$ catalyst regeneration control) which is performed by the NO$_x$ catalyst regeneration control module 202 in order to reduce and remove SO$_x$ (sulfur components, hereinafter also referred to as "stored SO$_x$") stored in the NO$_x$ catalyst 41.

As described above, in the NO$_x$ catalyst 41, the stored SO$_x$ is reduced when the air-fuel ratio of the exhaust gas is close to the stoichiometric air-fuel ratio ($\lambda \approx 1$) or rich ($\lambda < 1$). Thus, in order to bring the air-fuel ratio of the mixture gas close to the stoichiometric air-fuel ratio ($\lambda \approx 1$) or rich ($\lambda < 1$) in the DeSO$_x$ control as well, the post injection is performed in addition to the main injection.

Note that in order to reduce SO$_x$, which has a higher bonding force than NO$_x$, the temperature of the NO$_x$ catalyst 41 and the temperature of the exhaust gas passing therethrough need to be higher than the temperatures thereof in the DeNO$_x$ control (need to be elevated to about 600° C.). In this regard, causing the oxidation reaction of the unburned fuel in the oxidation catalyst 42 as described above results in a rise in the temperature of the exhaust gas passing through the first catalyst 43, that is, through the NO$_x$ catalyst 41.

Thus, in this embodiment, the DeSO$_x$ control includes alternately performing an enriching process for performing the post injection as in the DeNO$_x$ control to cause the air-fuel ratio of the exhaust gas to be richer than the air-fuel ratio during the normal operation so as to bring it close to or lower than the stoichiometric air-fuel ratio, and a lean process for performing the post injection, with the air-fuel ratio of the exhaust gas being lean, so as to supply air and the unburned fuel to the oxidation catalyst 42 to oxidize them therein.

In the enriching process, as in the active DeNO$_x$ control, the post injection is performed at the timing when the post-injected fuel combusts inside the combustion chamber 6 (in the early half of the expansion stroke, e.g., 30 to 70° CA after the CTDC). In the enriching process, the air excess ratios $\lambda$ of the mixture gas and the exhaust gas are set to about 1.0, i.e., close to the stoichiometric air-fuel ratio (e.g., $\lambda \approx 0.94$ to 1.06).

Moreover, in the enriching process, as in the active DeNO$_x$ control, the first EGR valve 57 is fully closed, whereas the second EGR valve 60 is opened to a degree lower than the degree of opening set during the normal operation, in order to improve the stability of the combustion of the post-injected fuel while reducing the soot generated in this combustion. Moreover, in order to lower the air-fuel ratio of the mixture gas, the PCM 200 (executing the NO$_x$ catalyst regeneration control module 202) controls the throttle valve 23, the exhaust bypass valve 49, and the wastegate valve 54 so that the intake air amount is smaller in the enriching process than in the normal operation.

In the lean process, meanwhile, the post injection is performed at the timing at which the post-injected fuel does not combust inside the combustion chamber 6 (in the latter half of the expansion stroke, e.g., 100 to 120° CA after the CTDC). Furthermore, the air excess ratios $\lambda$ of the mixture gas and the exhaust gas are set to 1 or higher, i.e., the air-fuel ratios of the mixture gas and the exhaust gas are set to be lean (e.g., $\lambda \approx 1.2$ to 1.4). Moreover, in the lean process, the first and second EGR valves 57 and 60 are both fully closed in order to prevent blockage of the EGR cooler, etc. caused by a deposit of unburned fuel.

In the DeSO$_x$ control, the air-fuel ratio of the mixture gas inside the combustion chamber 6 needs to be lean. In this regard, it is difficult to execute the DeSO$_x$ control within the second range R2 where the engine load is too high to bring the air-ratio to be sufficiently lean. Meanwhile, the control involving combustion of post-injected fuel is preferably performed within the first range R1 as described above. Thus, in this embodiment, the DeSO$_x$ control is executed exclusively when the engine body 1 is operated within the first range (specific operation range) R1.

Note that the PCM 200 computes, as the main injection amount, a fuel injection amount corresponding to a required torque calculated based on an accelerator opening, etc. Then, the PCM 200 estimates the oxygen concentration (prior to combustion) within the combustion chamber 6 based on the oxygen concentration of the exhaust gas detected by the exhaust gas O$_2$ sensor SN4 provided on the upstream side of the first catalyst 43 (the NO$_x$ catalyst 41), the intake air amount detected by the air flow sensor SN2, and the amount of EGR gas introduced into the combustion chamber 6. Subsequently, the PCM 200 computes a preliminary value of the post injection amount based on the estimated oxygen concentration within the combustion chamber 6, namely, the oxygen concentration of the intake air. Note that the amount of EGR gas is estimated, for example, based on the operating state of the engine and a difference in pressure between the EGR valves 57 and 60. Then, the PCM 200 performs feedback correction on the preliminary post injection amount based on the oxygen concentration of the exhaust gas detected by the exhaust gas O$_2$ sensor SN4, the main injection amount, etc. In other words, the PCM 200 performs a feedback control on the post injection amount to achieve a target air-fuel ratio of the exhaust gas corresponding to the detected oxygen concentration of the exhaust gas, and sets the air-fuel ratio of the exhaust gas to an appropriate value. Thus, in this embodiment, the post injection amount is changed and the air excess ratio $\lambda$ of the exhaust gas is changed accordingly.

With the air-fuel ratio of the mixture gas inside the combustion chamber 6 being lean, performing the post injection without causing combustion of the fuel as described above enables removal of PM by combustion. This means that removal of PM by combustion is possible during the lean process. In this embodiment, the air-fuel ratio of the mixture gas in the lean process is set to be equal to the air-fuel ratio set during the DPF regeneration control ($\lambda = 1.2$ to 1.4) as described above so that removal of PM by combustion is possible during the lean process.

(2-5) Control Flow

Figure 6:
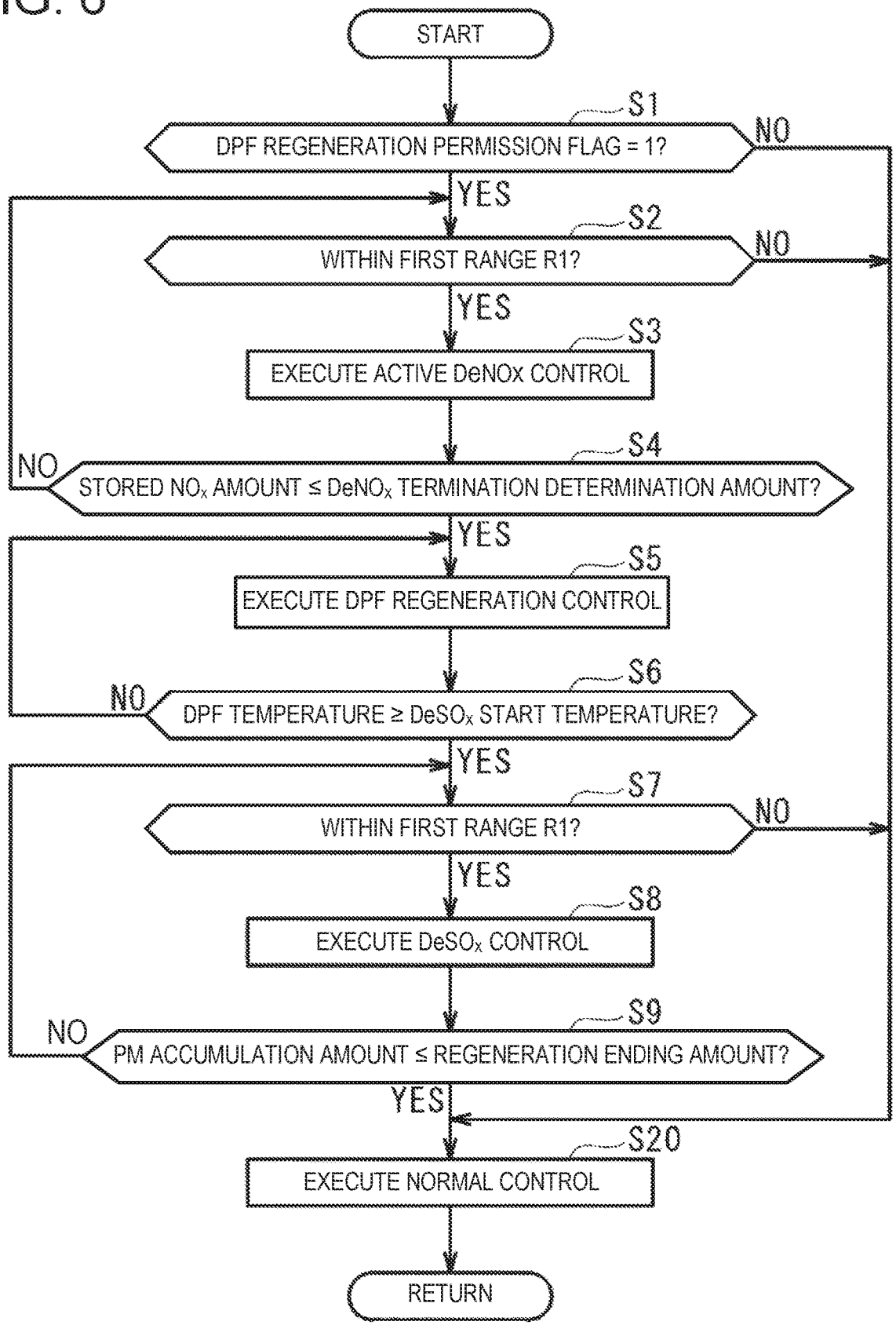
FIG. 6 is a flowchart illustrating a flow of a $DeNO_x$ control, a DPF control, and a $DeSO_x$ control.

The following describes the flows of the active DeNO$_x$ control, the DPF regeneration control, and the DeSO$_x$ control using the flowchart of FIG. 6.

In Step S1, the PCM 200 determines whether the DPF regeneration permission flag is 1. If the result of this determination is NO, the process proceeds to Step S20 where the PCM 200 performs the normal control and terminates the process (returns to Step S1). If the result of the determination in Step S1 is YES, the process proceeds to Step S2. The DPF regeneration permission flag is set to 1 when the regeneration of the DPF 44 is permitted, whereas the DPF regeneration permission flag is set to 0 when the regeneration is prohibited. In this embodiment, the DPF regeneration permission flag is set to 1 when the PM accumulation amount in the DPF 44 is equal to or larger than the regeneration starting amount, whereas the DPF regeneration permission flag is set to 0 when the PM accumulation amount is equal to or smaller than a regeneration ending amount. The regeneration ending amount is the PM accumulation amount which is as small as the level at which removal of PM from the DPF 44 is no longer necessary, and is set to, for example, a value close to 0.

In Step S2, the PCM 200 determines whether the engine body 1 is operated within the first range R1. If the result of the determination is NO, the process proceeds to Step S20 where the PCM 200 performs the normal control and terminates the process (returns to Step S1). If the result of the determination in Step S2 is YES, the process proceeds to Step S3.

In Step S3, the PCM 200 (executing the $NO_x$ catalyst rich purge control module 201) performs the active $DeNO_x$ control.

Then, the process proceeds to Step S4. In Step S4, the PCM 200 (executing the $NO_x$ catalyst rich purge control module 201) determines whether the stored $NO_x$ amount is equal to or smaller than a given $DeNO_x$ termination determination amount, that is, whether the stored $NO_x$ amount has decreased to be equal to or smaller than the $DeNO_x$ termination determination amount due to the execution of the active $DeNO_x$ control. If the result of this determination is NO, the process returns to Step S2. If the result of this determination is YES, the process proceeds to Step S5. In other words, the PCM 200 (executing the $NO_x$ catalyst rich purge control module 201) continues to execute the active $DeNO_x$ control until the stored $NO_x$ amount becomes equal to or smaller than the $DeNO_x$ termination determination amount, that is, until when the result of the determination is YES. The $DeNO_x$ termination determination amount is set to, for example, a value close to 0.

When the result of the determination in Step S4 is YES, the PCM 200 (executing the $NO_x$ catalyst rich purge control module 201) proceeds to Step S5. In Step S5, the PCM 200 stops the active $DeNO_x$ control and starts executing the DPF regeneration control. Then, the process proceeds to Step S6.

In Step S6, the PCM 200 (executing the PM filter regeneration control module 203) determines whether the temperature of the DPF 44 is a $DeSO_x$ starting temperature or higher. If the result of this determination is NO, the PCM 200 (executing the PM filter regeneration control module 203) returns to Step S5. In other words, the PCM 200 (executing the PM filter regeneration control module 203) continues to execute the DPF regeneration control until the DPF 44 is heated to the $DeSO_x$ starting temperature or higher. The temperature of the DPF 44 is detected by an exhaust gas temperature sensor disposed immediately upstream or immediately downstream of the DPF 44. The $DeSO_x$ starting temperature is set to a temperature at which PM is efficiently removed from the DPF 44 by combustion, and is set to, for example, 600° C. in this embodiment.

Then, when the DPF 44 is heated to the $DeSO_x$ starting temperature or higher, that is, when the result of the determination in Step S6 is YES, the PCM 200 proceeds to Step S7. In Step S7, the PCM 200 determines whether the engine body 1 is operated within the first range R1. If the result of the determination is NO, the process proceeds to Step S20 where the PCM 200 performs the normal control and terminates the process (returns to Step S1).

If the result of the determination in Step S7 is YES, the process proceeds to Step S8 where the PCM 200 (executing the $NO_x$ catalyst regeneration control module 202) starts executing the $DeSO_x$ control. In other words, when the temperature of the DPF 44 reaches the level at which efficient removal of PM by combustion is possible, the control is switched to the $DeSO_x$ control, thus preventing the $NO_x$ catalyst 41 from being subjected to a DPF regeneration condition suited to regeneration of the DPF 44, that is, the condition under which the air-fuel ratio is lean and the DPF 44 is exposed to elevated temperatures.

Figure 7A:
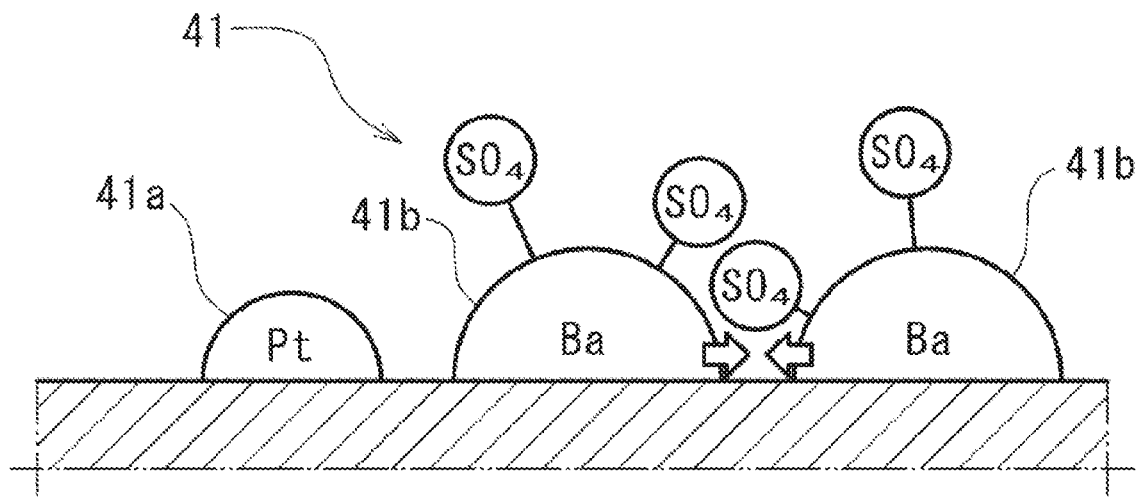
FIGS. 7A and 7B are views schematically illustrating coagulation of sulfur components in the $NO_x$ catalyst.

The present inventors have found that when the $NO_x$ catalyst 41 is subjected to the DPF regeneration condition over a long period of time, it becomes difficult to remove the stored $SO_x$ by the $DeSO_x$ control presumably because of the following reasons. As schematically illustrated in FIG. 7A, $SO_x$ is stored (occluded), for example, by the occluding agent 41*b* on the $NO_x$ catalyst 41, and when the $NO_x$ catalyst 41 is subjected to the DPF regeneration condition, the occluding agent 41*b* is likely to coagulate.

Figure 7B:
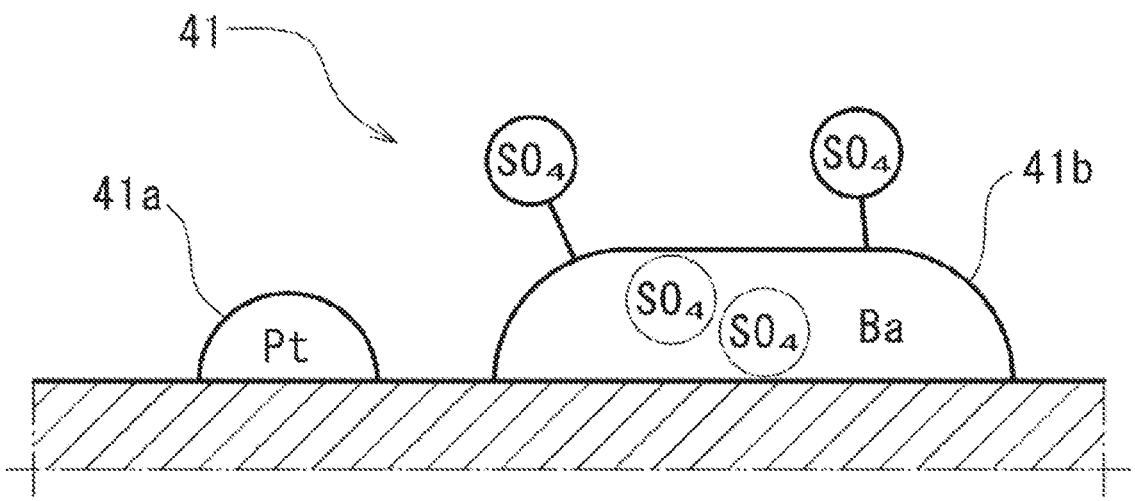

In addition, when the $NO_x$ catalyst 41 is subjected to temperature higher than the temperature under the DPF regeneration condition or subjected to the DPF regeneration condition for a longer period of time, the coagulation of the occluding agent 41*b* is further accelerated as illustrated in FIG. 7B, making it difficult for the stored $SO_x$ to react with the catalytic metal 41*a*. Note that the regeneration of the DPF 44 generally requires a longer period of time, and thus, the $NO_x$ catalyst 41 is likely to be subjected to the DPF regeneration condition for a long period of time. Consequently, even if the $DeSO_x$ control is executed, it is difficult to remove the stored $SO_x$ from the $NO_x$ catalyst 41.

In this regard, the $DeSO_x$ control in this embodiment is started when the DPF 44 is heated to temperatures at which efficient removal of PM by combustion is possible as described above. This prevents the $NO_x$ catalyst 41 from being subjected to the DPF regeneration condition for a long period of time. Consequently, coagulation of the occluding agent 41*b* in the $NO_x$ catalyst 41 is inhibited, so that $SO_x$ is easily removed from the $NO_x$ catalyst 41 in the subsequent $DeSO_x$ control.

Subsequent to Step S8, the process proceeds to Step S9. As described above, the $DeSO_x$ control includes alternately performing the enriching process in which the stored $SO_x$ is removed and the lean process in which the $NO_x$ catalyst is kept at high temperatures and PM is removed from the DPF 44 by combustion. In other words, the amount of the stored $SO_x$ decreases in the enriching process, whereas the amount of PM decreases in the lean process.

In Step S9, the PCM 200 determines whether the PM accumulation amount is equal to or smaller than the given regeneration ending amount. If the result of this determination is NO, the PCM 200 (executing the $NO_x$ catalyst regeneration control module 202) returns to Step S7. In other words, the PCM 200 (executing the $NO_x$ catalyst regeneration control module 202) continues to execute the $DeSO_x$ control until the PM accumulation amount decreases to be equal to or smaller than the regeneration ending amount. If the result of the determination is YES, the PCM 200 (executing the $NO_x$ catalyst regeneration control module 202) proceeds to Step S20 where the PCM 200 performs the normal control and terminates the process.

Figure 8:
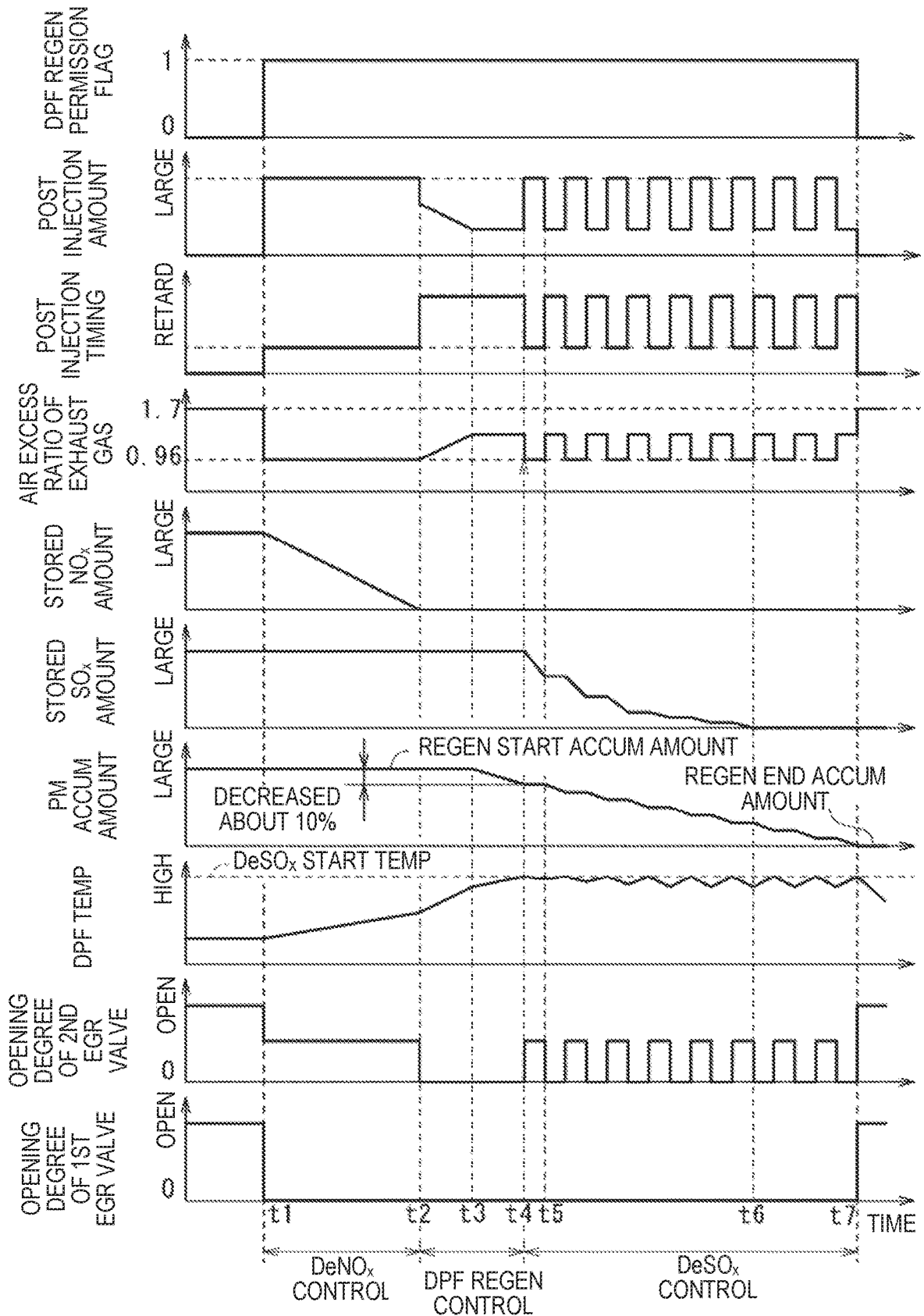
FIG. 8 shows time charts schematically illustrating changes in parameters over time during execution of the $DeSO_x$ control, etc.

FIG. 8 shows charts schematically illustrating changes of parameters over time during execution of the above controls.

When the DPF regeneration permission flag changes from 0 to 1 at time t1, the active $DeNO_x$ control is executed. For example, the air-fuel ratio of the exhaust gas is set to be rich and the post injection is performed. Here, the injection timing of the post injection is set on the comparatively advance side (the early half of the expansion stroke) so that the post-injected fuel combusts inside the combustion chamber 6. In addition, the first EGR valve 57 is fully closed and the second EGR valve 60 is opened to a degree smaller than the degree of opening set during the normal operation, i.e., immediately before time t1 (is set closer to the closed state). Note that the second EGR valve 60 is not fully closed.

After time t1, the stored $NO_x$ amount gradually decreases due to the execution of the active $DeNO_x$ control. After time t1, the temperature of the DPF 44 is gradually elevated due a rise in the temperature of the exhaust gas resulting from the combustion of the post-injected fuel inside the combustion chamber 6. Moreover, although not illustrated, the temperature of the oxidation catalyst 42 is also elevated gradually.

At time t2, i.e., when the stored $NO_x$ amount decreases to be equal to or smaller than the $DeNO_x$ termination determination amount, the active $DeNO_x$ control is stopped, and subsequently the DPF regeneration control is started (PM filter regeneration step).

For example, at time t2, the air-fuel ratio of the exhaust gas is switched to be lean. Moreover, although the post injection is still performed after time t2, the injection timing of the post injection is set on the retarding side (the latter half of the expansion stroke), and the post-injected fuel is discharged to the exhaust passage 40 without combusting inside the combustion chamber 6. In addition, the second EGR valve 60 is fully closed similarly to the first EGR valve 57.

By this control, oxidation reactions occur in the oxidation catalyst 42 and the oxidation catalyst layer 44d, causing a rise in the temperature of the exhaust gas, which in turn further elevates the temperature of the DPF 44.

In the example of FIG. 8, at time t2, the temperature of the DPF 44 has not reached the level at which combustion of PM is possible. When the temperature reaches this level at time t3, the PM accumulation amount starts decreasing. In the example of FIG. 8, when the temperature of the DPF reaches the level at which combustion of PM is possible, the post injection amount is reduced.

At time t4, i.e., when the DPF 44 is heated to the $DeSO_x$ starting temperature or higher, that is, 600° C. or higher, the $DeSO_x$ control is started ($NO_x$ catalyst regeneration step). Here, the PM accumulation amount in the DPF 44 has decreased to be about 10% less than the regeneration starting amount. For example, at time t4, the enriching process is performed, where the post injection in which the injection timing is on the comparatively advance side and the injected fuel combusts inside the combustion chamber 6 is performed, and the air-fuel ratio of the exhaust gas is set to be rich. In addition, the second EGR valve 60 is opened. Note that in the enriching process, as in the active $DeNO_x$ control, the second EGR valve 60 is opened to a degree lower than the degree of opening set during the normal operation, i.e., lower than the opening set immediately before time t1 (is set closer to the closed state). In this embodiment, the degree of the opening of the second EGR valve 60 set during the enriching process and the degree of the opening thereof set during the active $DeNO_x$ control are substantially the same. Note that the first EGR valve 57 is kept fully closed.

Next, at time t5, the lean process is performed, where the post injection in which the injection timing is on the comparatively retarding side and the injected fuel does not combust inside the combustion chamber 6 is performed, and the air-fuel ratio of the exhaust gas is set to be lean. In addition, the second EGR valve 60 is fully closed again. Note that the first EGR valve 57 is still kept fully closed.

The enriching process and the lean process are repeated, and thus, the stored $SO_x$ amount decreases after time t4. Specifically, the stored $SO_x$ amount decreases due to execution of the enriching process. The PM accumulation amount also decreases due to the execution of the lean process.

At time t6, the stored $SO_x$ amount decreases to a level (e.g., close to 0) at which the $DeSO_x$ control is no longer necessary; however, the $DeSO_x$ control is continued because the PM accumulation amount is still larger than the regeneration ending amount.

Then, at time t7, i.e., when the PM accumulation amount decreases to be equal to or smaller than the regeneration ending amount at time t7, the $DeSO_x$ control is terminated and switched to the normal control. For example, the post injection amount is set to 0 to stop the post injection. In addition, the first EGR valve 57 is opened, and the second EGR valve 60 is opened to a degree larger than the degree of opening set in the $DeNO_x$ control and the degree of opening set during the enriching process of the $DeSO_x$ control. Moreover, the DPF regeneration permission flag is set 0.

In this embodiment, the $DeSO_x$ control is executed, where the amount of the stored $SO_x$ in the $NO_x$ catalyst 41 decreases in the enriching process and PM is removed from the DPF 44 by combustion in the lean process, with the $NO_x$ catalyst 41 and the DPF 44 designed to have appropriate capacities so as to eliminate sulfur poisoning before the PM accumulation amount decreases to the regeneration ending amount. The $NO_x$ sensor disposed on the upstream side of the SCR catalyst 46 detects the amount of $NO_x$ having slipped away from the $NO_x$ catalyst 41, on the basis of which the $NO_x$ catalyst 41 is indirectly checked to ensure that the $NO_x$ catalyst 41 subjected to sulfur poisoning does drop to a level at which the stored $NO_x$ amount is inadmissible.

(3) Effects, Etc.

In this embodiment, the $DeSO_x$ control is started when the DPF 44 is heated to the temperature (600° C.) at which efficient removal of PM is possible, that is, after a lapse of a comparatively short period of time subsequent to the start of the DPF regeneration control as described above, and thus, the $NO_x$ catalyst 41 is subjected to the DPF regeneration condition for a limited amount of time. Consequently, coagulation of the occluding agent 41b in the $NO_x$ catalyst 41 is inhibited, thus being less likely to hinder the reaction of $SO_x$ with the catalytic metal 41a. This facilitates removal of the stored $SO_x$ from the $NO_x$ catalyst 41 and enables the $NO_x$ catalyst 41 to recover from sulfur poisoning efficiently in the $NO_x$ catalyst regeneration control.

Furthermore, the $DeSO_x$ control is executed after removal of a given amount of PM accumulation in the DPF 44, thus inhibiting an excessive rise in the temperature of DPF 44 during the $DeSO_x$ control.

The reason for this is as follows. The unburned fuel is likely to adhere to the DPF 44 in the rich state during the $NO_x$ catalyst regeneration control and is likely to react with oxygen supplied in the lean state, resulting in a rise in the temperature of the DPF 44. If there is a large amount of PM accumulation in the DPF 44, chain-reaction combustion of PM may be accelerated due to the rise in the temperature of the DPF 44, and the temperature of the DPF 44 may be elevated excessively. According to the present disclosure, meanwhile, the $DeSO_x$ control is executed after the PM accumulation amount in the DPF 44 is reduced to some extent, thus inhibiting an excessive rise in the temperature of the DPF 44 during the $DeSO_x$ control.

The post-injected fuel combusts inside the combustion chamber 6 during the active $DeNO_x$ control, which is immediately followed by the DPF regeneration control.

Due to the rise in the temperature of the exhaust gas during the active $DeNO_x$ control, the oxidation catalyst 42 is activated and the temperature of the DPF 44 is elevated, which advance, in the subsequent DPF regeneration control, the start timing of the combustion of PM captured by the DPF 44. Therefore, as compared to the case where the active DeNO$_x$ control and the DPF regeneration control are executed at different timings, this embodiment shortens a period of time between the start of the DPF regeneration control and when the temperature of the DPF 44 reaches to the level at which PM combusts, thus requiring a small amount of unburned fuel supply to the oxidation catalyst 42 for this temperature rise and achieving improved fuel efficiency accordingly.

Furthermore, NO$_x$ stored in the NO$_x$ catalyst 41 is reduced before execution of the DPF regeneration control. Thus, any rise in the temperature of the NO$_x$ catalyst 41 associated with the execution of the DPF regeneration control does not involve release of a large amount of NO$_x$ from the NO$_x$ catalyst 41, and improved exhaust performance is achieved accordingly.

In this embodiment, the fuel injected by the post injection during the active DeNO$_x$ control combusts inside the combustion chamber 6. As compared to the case where the post injection is performed at a retarded timing at which the post-injected fuel does not combust inside the combustion chamber 6, this embodiment reduces the amount of post-injected fuel which leaks from the combustion chamber 6 to the crankcase side and is mixed into engine oil, and prevents blockage of various devices in the exhaust passage caused by a deposit of the unburned fuel.

In this embodiment, after the DPF regeneration control is started and when the DPF 44 is heated to the DeSO$_x$ starting temperature or higher, the DeSO$_x$ control including the lean process is started. Therefore, the execution of the DeSO$_x$ control enables reduction and removal of SO$_x$ stored in the NO$_x$ catalyst as well as combustion and removal of PM in the DPF 44, thus efficiently restoring high purifying performances of the NO$_x$ catalyst 41 and the DPF 44. That is, as compared to the case where the DPF regeneration control and the DeSO$_x$ control are separately executed, this embodiment shortens the time period required for the regeneration control for the DPF 44, reduces the amount of fuel required for combustion of PM in the DPF 44, and achieves further improved fuel efficiency.

In this embodiment, during the enriching process of the DeSO$_x$ control, each of the EGR valves 57 and 60 is controlled to be opened to a degree lower than the degree of opening set during the normal operation (i.e., during the operation which does not involve execution of the DeSO$_x$ control). Moreover, in the DPF regeneration control, the EGR valve 60 is controlled to be fully closed (i.e., the degree of opening is lower than the degree of opening in the DeSO$_x$ control).

Therefore, during the DPF regeneration control, this embodiment prevents blockage of various devices in the exhaust passage 40, such as the EGR cooler 58, caused by a deposit of unburned fuel discharged to the exhaust passage 40. In addition, during the enriching process of the DeSO$_x$ control, this embodiment reduces the amount of soot generated by the combustion of the post-injected fuel while improving the combustion stability of this fuel.

In this embodiment, during the active DeNO$_x$ control, each of the EGR valves 57 and 60 are controlled to be opened to a degree lower than the degree of opening set during the normal control (i.e., during the operation which does not involve execution of the active DeNO$_x$ control), as in the above case. Thus, during the DeNO$_x$ control, this embodiment reduces the amount of soot generated by the combustion of the post-injected fuel while improving the combustion stability of this fuel.

This embodiment, in which the DeSO$_x$ control is executed every time the DPF regeneration control is executed, easily keeps the SO$_x$ accumulation amount at a low level, and inhibits incorporation of SO$_x$ caused by coagulation, thus ensuring high NO$_x$ purification efficiency.

(4) Modifications

In the above embodiment, the DeSO$_x$ control is started after the DPF regeneration control is started and when the DPF 44 is heated to the DeSO$_x$ starting temperature. Alternatively, the DeSO$_x$ control may be started when the PM accumulation amount decreases by a given amount from the regeneration starting amount.

For example, the DeSO$_x$ control may be started before the PM accumulation amount decreases to be 50% or more less than the regeneration starting amount. This prevents prolongation of the DPF regeneration control, and in turn prevents the NO$_x$ catalyst 41 from being subjected to the DPF regeneration condition for a long period of time. Consequently, coagulation of the occluding agent 41b in the NO$_x$ catalyst 41 is inhibited, thus being less likely to hinder the reaction of SO$_x$ with the catalytic metal 41a. This facilitates removal of SO$_x$ from the NO$_x$ catalyst 41 during the DeSO$_x$ control.

Alternatively, the DeSO$_x$ control may be started after the PM accumulation amount decreases to be 10% or more less than the regeneration starting amount. With the PM accumulation amount in the DPF 44 having already been reduced to some extent, an excessive rise in the temperature of the DPF 44 is inhibited during the DeSO$_x$ control.

Although the active DeNO$_x$ control, the DPF regeneration control subsequent thereto, and the DeSO$_x$ control are executed while the engine body 1 is operated within the first range R1 in the above embodiment, these controls may be executed while the engine body 1 is operated outside the first range R1.

Furthermore, although the second EGR valve 60 is fully closed during the DPF regeneration control in the above embodiment, the second EGR valve 60 may be opened during the DPF regeneration control. Note that as in the above case, the post-injected fuel does not combust during the DPF regeneration control, and thus, in order to prevent blockage of the EGR cooler, etc., it is preferred that during the DPF regeneration control, the second EGR valve 60 is opened to a degree lower than the degrees of opening set during the normal operation, the active DeSO$_x$ control, and the enriching process of the DeNO$_x$ control. Additionally, the degree of opening of the second EGR valve 60 set during the DeNO$_x$ control may be different from the degree of opening thereof set during the DeSO$_x$ control.

In the case where the DeSO$_x$ control start timing is set based on the PM accumulation amount, the SO$_x$ accumulation amount in the NO$_x$ catalyst 41 may be estimated based on the operating state of the engine and the DeSO$_x$ start timing may be delayed when the estimated SO$_x$ amount is small. For example, a reference PM accumulation amount threshold value (10% less than the regeneration starting amount) being a condition for starting the DeSO$_x$ control in this embodiment may be corrected so that a reference PM accumulation amount is smaller for a smaller SO$_x$ accumulation amount at the DeSO$_x$ control start timing. Additionally, the air-fuel ratio in the rich state during the DeSO$_x$ is controlled to be richer for a larger SO$_x$ accumulation amount so as to increase the SO$_x$ regeneration speed. Furthermore, the injection timing of the post injection in the rich state during the DeSO$_x$ control is controlled to be on a more advanced side for a larger SO$_x$ accumulation amount so as to increase the SO$_x$ regeneration speed. These settings inhibit incorporation of SO$_x$ and enables efficient execution of the DeSO$_x$ control and the DPF regeneration control.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body (Engine)
2 Cylinder
6 Combustion Chamber
10 Injector
40 Exhaust Passage
41 NO$_x$ Catalyst
42 Oxidation Catalyst
44 DPF (PM Filter)
200 PCM (Controller)
201 NO$_x$ Catalyst Rich Purge Control Module
202 NO$_x$ Catalyst Regeneration Control Module
203 PM Filter Regeneration Control Module

What is claimed is:

1. A control device for an engine comprising:
an oxidation catalyst provided in an exhaust passage of the engine and configured to oxidize unburned fuel within exhaust gas;
a NO$_x$ catalyst provided integrally with the oxidation catalyst or in the exhaust passage downstream of the oxidation catalyst;
a particulate matter (PM) filter provided in the exhaust passage downstream of the oxidation catalyst and configured to capture fine particulate matter within the exhaust gas;
an injector configured to supply fuel to a combustion chamber of the engine; and
a controller connected to the injector and including a processor configured to control an amount of the fuel injected from the injector, wherein
when determining that an accumulation amount of the fine particulate matter is equal to or higher than a given regeneration starting amount, the controller starts a PM filter regeneration control in which the fine particulate matter captured by the PM filter is removed from the PM filter,
after the PM filter regeneration control is started and when the accumulation amount of the fine particulate matter in the PM filter decreases by a given amount, the controller starts a NO$_x$ catalyst regeneration control in which the controller controls the amount of the fuel injected from the injector so as to switch between a first state in which an air-fuel ratio of the exhaust gas is equal to or lower than a stoichiometric air-fuel ratio and a second state in which the air-fuel ratio of the exhaust gas is higher than the stoichiometric air-fuel ratio,
the controller performs a NO$_x$ catalyst rich purge control to reduce NO$_x$ stored in the NO$_x$ catalyst by bringing the air-fuel ratio to be rich, and
the controller starts the PM filter regeneration control immediately after the NO$_x$ catalyst rich purge control is terminated.

2. The control device according to claim 1, wherein the controller starts the NO$_x$ catalyst regeneration control when the PM filter is heated to a temperature of 600° C. or higher during the PM filter regeneration control.

3. The control device according to claim 1, wherein the given amount is 50% or less of the regeneration starting amount during the PM filter regeneration control.

4. The control device according to claim 3, wherein the given amount is 10% or more of the regeneration starting amount during the PM filter regeneration control.

5. A method of controlling an engine including, in an exhaust passage thereof, an oxidation catalyst configured to oxidize unburned fuel in exhaust gas, a NO$_x$ catalyst provided integrally with the oxidation catalyst or downstream of the oxidation catalyst and configured to store NO$_x$ within the exhaust gas introduced to the NO$_x$ catalyst in a lean state in which an air-fuel ratio of the exhaust gas is lean and to reduce the stored NO$_x$ in a rich state in which the air-fuel ratio is equal to a stoichiometric air-fuel ratio or rich, and a particulate matter (PM) filter provided downstream of the oxidation catalyst and configured to capture fine particulate matter within the exhaust gas, the method comprising:
regenerating the NO$_x$ catalyst through removal of sulfur components stored in the NO$_x$ catalyst by switching between the rich state and the lean state in which the unburned fuel is introduced to the oxidation catalyst; and
regenerating the PM filter through removal of the captured fine particulate matter from the PM filter by bringing the air-fuel ratio of the exhaust gas introduced to the PM filter to be lean and introducing the unburned fuel to the oxidation catalyst,
wherein when an accumulation amount of the fine particulate matter is equal to or larger than a given regeneration starting amount, the regenerating of the PM filter is started, and thereafter, before the accumulation amount of the fine particulate matter decreases to be equal to or smaller than a regeneration ending amount that is smaller than the given regeneration starting amount, the regenerating of the NO$_x$ catalyst is started.

6. A control device for an engine including, in an exhaust passage thereof, an oxidation catalyst configured to oxidize unburned fuel in exhaust gas, a NO$_x$ catalyst provided integrally with the oxidation catalyst or downstream of the oxidation catalyst and configured to store NO$_x$ within the exhaust gas introduced to the NO$_x$ catalyst in a lean state in which an air-fuel ratio of the exhaust gas is lean and to reduce the stored NO$_x$ in a rich state in which the air-fuel ratio is equal to a stoichiometric air-fuel ratio or rich, and a particulate matter (PM) filter provided downstream of the oxidation catalyst and configured to capture fine particulate matter within the exhaust gas, the control device comprising:
a processor configured to execute:
a NO$_x$ catalyst regeneration control module to perform a NO$_x$ catalyst regeneration control to remove sulfur components stored in the NO$_x$ catalyst by switching between the rich state and the lean state in which the unburned fuel is introduced to the oxidation catalyst; and
a PM filter regeneration control module to perform a PM filter regeneration control to remove the captured fine particulate matter from the PM filter by bringing the air-fuel ratio of the exhaust gas introduced to the PM filter to be lean and introducing the unburned fuel to the oxidation catalyst, wherein when an accumulation amount of the fine particulate matter is equal to or larger than a given regeneration starting amount, the PM filter regeneration control module starts the PM filter regeneration control, and thereafter, before the accumulation amount of the fine particulate matter decreases to be equal to or smaller than a regeneration ending amount that is smaller than the given regeneration starting amount, the $NO_x$ catalyst regeneration control module starts the $NO_x$ catalyst regeneration control.

7. The control device according to claim 6, wherein the $NO_x$ catalyst regeneration control module starts the $NO_x$ catalyst regeneration control when the PM filter is heated to a temperature of 600° C. or higher during the PM filter regeneration control.

8. The control device according to claim 6, wherein the $NO_x$ catalyst regeneration control module starts the $NO_x$ catalyst regeneration control when the accumulation amount of the fine particulate matter decreases by a given amount from the regeneration starting amount during the PM filter regeneration control.

9. The control device according to claim 8, wherein the given amount is 50% or less of the regeneration starting amount.

10. The control device according to claim 9, wherein the given amount is 10% or more of the regeneration starting amount.

11. The control device according to claim 6, further comprising a $NO_x$ catalyst rich purge control module configured to perform a $NO_x$ catalyst rich purge control to reduce $NO_x$ stored in the $NO_x$ catalyst by bringing the air-fuel ratio to be rich, wherein the PM filter regeneration control module starts the PM filter regeneration control immediately after the $NO_x$ catalyst rich purge control is terminated.

* * * * *